US009862246B2

(12) United States Patent
Kikuchi et al.

(10) Patent No.: US 9,862,246 B2
(45) Date of Patent: Jan. 9, 2018

(54) AIR CONDITIONING CONTROL DEVICE OF VEHICLE

(71) Applicant: TOYOTA JIDOSHA KABUSHIKI KAISHA, Toyota-shi, Aichi-ken (JP)

(72) Inventors: Takuro Kikuchi, Ichinomiya (JP); Yoshihiro Nomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 546 days.

(21) Appl. No.: 14/456,772

(22) Filed: Aug. 11, 2014

(65) Prior Publication Data

US 2015/0053370 A1    Feb. 26, 2015

(30) Foreign Application Priority Data

Aug. 22, 2013 (JP) .................................. 2013-172012

(51) Int. Cl.
    *B60H 1/00*    (2006.01)

(52) U.S. Cl.
    CPC ..... *B60H 1/00742* (2013.01); *B60H 1/00778* (2013.01); *B60H 1/00878* (2013.01); *B60H 1/00964* (2013.01)

(58) Field of Classification Search
    CPC ............ B60H 1/00742; B60H 1/00778; B60H 1/00878; B60H 1/00964; B60H 1/00978
    USPC ........................................................ 165/202
    See application file for complete search history.

(56) References Cited

U.S. PATENT DOCUMENTS

| | | | | |
|---|---|---|---|---|
| 4,280,330 A | * | 7/1981 | Harris | B60H 1/00478 123/198 R |
| 5,063,513 A | * | 11/1991 | Shank | B60H 1/2206 123/142.5 E |
| 5,330,385 A | * | 7/1994 | Hotta | B60H 1/00392 165/42 |
| 5,595,064 A | * | 1/1997 | Ikeda | B60H 1/00392 180/65.1 |

(Continued)

FOREIGN PATENT DOCUMENTS

| | | |
|---|---|---|
| JP | H03-167026 A | 7/1991 |
| JP | A-2006-57583 | 3/2006 |

(Continued)

OTHER PUBLICATIONS

Partial Translation of Aug. 18, 2015 Office Action issued in Japanese Patent Application No. 2013-172012.

*Primary Examiner* — Travis Ruby
(74) *Attorney, Agent, or Firm* — Oliff PLC (57) ABSTRACT

An air conditioning control device of a vehicle in which an air conditioner for adjusting a temperature in a cabin is mounted is provided. The air conditioning control device includes a setting portion, a detector, and an electronic control unit. The setting portion is configured to set an execution schedule of pre-air conditioning that the air conditioner is actuated before a user gets in a vehicle. The detector is configured to detect boarding on the vehicle. The electronic control unit is configured to actuate the air conditioner in accordance with the set execution schedule of the pre-air conditioning, and is also configured to notify the user about execution of the pre-air conditioning when the boarding of the user on the vehicle is detected after the air conditioner is actuated in accordance with the set execution schedule of the pre-air conditioning.

6 Claims, 6 Drawing Sheets

(56) References Cited

U.S. PATENT DOCUMENTS

| | | | | |
|---|---|---|---|---|
| 5,739,674 | A * | 4/1998 | Kawahara | H02J 7/0063 320/106 |
| 5,942,988 | A * | 8/1999 | Snyder | F02N 11/0807 123/179.4 |
| 6,073,456 | A * | 6/2000 | Kawai | B60H 1/004 62/133 |
| 6,345,767 | B1 * | 2/2002 | Burrus, IV | B60H 1/00735 236/1 R |
| 6,357,244 | B1 * | 3/2002 | Mori | G08G 1/202 165/202 |
| 6,619,835 | B2 * | 9/2003 | Kita | A44C 5/0015 368/10 |
| 7,055,340 | B2 * | 6/2006 | Umebayashi | B60H 1/00642 236/51 |
| 8,006,508 | B2 * | 8/2011 | Kojima | B60H 1/0065 180/65.27 |
| 8,909,390 | B2 * | 12/2014 | Tonegawa | B60H 1/00257 165/202 |
| 9,488,980 | B2 * | 11/2016 | Haberl | G05D 1/0016 |
| 2004/0168663 | A1 * | 9/2004 | Matsuura | B60R 25/209 123/179.2 |
| 2004/0194479 | A1 * | 10/2004 | Umebayashi | B60H 1/00642 62/126 |
| 2004/0262068 | A1 * | 12/2004 | Matsubara | B60R 25/04 180/287 |
| 2005/0225175 | A1 * | 10/2005 | Maehara | B60W 10/06 307/10.1 |
| 2008/0287074 | A1 * | 11/2008 | Grunhold | H04M 1/6091 455/90.2 |
| 2009/0064695 | A1 * | 3/2009 | Kojima | B60H 1/0065 62/230 |
| 2010/0072290 | A1 * | 3/2010 | Dage | B60H 1/00657 236/51 |
| 2010/0235046 | A1 * | 9/2010 | Proefke | B60H 1/00642 701/36 |
| 2011/0071734 | A1 * | 3/2011 | Van Wiemeersch | G08C 17/02 701/49 |
| 2011/0256904 | A1 * | 10/2011 | Simmons | B60R 25/00 455/556.1 |
| 2013/0079978 | A1 * | 3/2013 | Uyeki | B60H 1/00657 701/36 |
| 2016/0107656 | A1 * | 4/2016 | Lovett | B60H 1/00657 701/22 |
| 2016/0193895 | A1 * | 7/2016 | Aich | B60H 1/00657 165/202 |
| 2016/0207375 | A1 * | 7/2016 | Gauthier | B60H 1/00771 |
| 2016/0244010 | A1 * | 8/2016 | Tseng | B60R 16/037 |

FOREIGN PATENT DOCUMENTS

| | | |
|---|---|---|
| JP | A-2006-298134 | 11/2006 |
| JP | 2008-238832 A | 10/2008 |
| JP | 2009-111674 A | 5/2009 |
| JP | 2009-113674 A | 5/2009 |
| JP | 2010234905 A | 10/2010 |

* cited by examiner

| DAY | START TIME |
|---|---|
| MONDAY | AM 9:00 |
| TUESDAY | AM 10:00 |
| WEDNESDAY | AM 10:00 |
| THURSDAY | AM 9:00 |
| FRIDAY | AM 7:30 |
| SATURDAY | PM 1:00 |
| SUNDAY | PM 3:00 |

PRE-AIR CONDITIONING HAS BEEN EXECUTED THREE
TIMES ACCORDING TO THE SET SCHEDULE.

THE EXECUTED DATES AND TIMES ARE AS FOLLOWS.

JULY 22 MONDAY AM 9:00

JULY 23 TUESDAY AM 10:00

JULY 24 WEDNESDAY AM 10:00

AIR CONDITIONING CONTROL DEVICE OF VEHICLE

INCORPORATION BY REFERENCE

The disclosure of Japanese Patent Application No. 2013-172012 filed on Aug. 22, 2013 including the specification, drawings and abstract is incorporated herein by reference in its entirety.

BACKGROUND OF THE INVENTION

1. Field of the Invention

The present invention relates to an air conditioning control device of a vehicle, and in particular to an air conditioning control device of a vehicle capable of so-called pre-air conditioning, that is, an air conditioner is actuated before a user gets in a vehicle.

2. Description of Related Art

A vehicle with a pre-air conditioning function has conventionally been known. For example, a vehicle described in Japanese Patent Application Publication No. 2006-298134 (JP 2006-298134 A) includes a pre-air conditioning main switch. When a user turns on the pre-air conditioning switch, execution of pre-air conditioning is permitted.

However, in a case where a vehicle has a function to execute the pre-air conditioning at predetermined time intervals, such as a function of weekly pre-air conditioning, a problem arises that the user forgets she/he has set the weekly pre-air conditioning and the pre-air conditioning is executed even when the user does not get in the vehicle.

SUMMARY OF THE INVENTION

In view of the above problem, the present invention provides an air conditioning control device of a vehicle that can prevent repetitive pre-air conditioning when a user does not get in a vehicle.

According to one aspect of the present invention, the air conditioning control device for a vehicle in which an air conditioner that adjusts a temperature in a cabin is mounted is provided. The air conditioning control device includes a setting portion, a detector, and an electronic control unit. The setting portion is configured to set an execution schedule of pre-air conditioning to actuate the air conditioner before a user gets in a vehicle. The detector is configured to detect boarding of the user on the vehicle. The electronic control unit is configured to actuate the air conditioner in accordance with the set execution schedule of the pre-air conditioning. In addition, the pre-air conditioning control portion is configured to notify the user about execution of the pre-air conditioning when the boarding of the user on the vehicle is detected after the air conditioner is actuated in accordance with the set execution schedule of the pre-air conditioning.

According to the air conditioning control device of the vehicle, the execution of the pre-air conditioning is notified to the user when the boarding of the user on the vehicle is detected. Thus, the user can know the execution of the pre-air conditioning, and it is possible to prevent repetitive execution of the pre-air conditioning when the user does not get in the vehicle.

The electronic control unit may be configured to notify the user about the execution of the pre-air conditioning next time the boarding of the user on the vehicle is detected, when the boarding of the user on the vehicle is not detected during the actuation of the air conditioner in accordance with the set execution schedule of the pre-air conditioning for a first predetermined number of times Accordingly, in the case where the boarding of the user on the vehicle is not detected during the actuation of the air conditioner in accordance with the set execution schedule of the pre-air conditioning for the first predetermined number of times, the user is notified about the execution of the pre-air conditioning. Thus, the user can know the unnecessary execution of the pre-air conditioning, and the user can change or cancel setting of the execution schedule of the pre-air conditioning.

The electronic control unit may be configured to notify the execution of the pre-air conditioning as well as a date and time when the pre-air conditioning is executed and/or the number of times that the pre-air conditioning is executed.

Accordingly, the user can know the number of times as well as the date and time that the unnecessary pre-air conditioning is executed. In addition, the pre-air conditioning control portion may be configured to cancel the setting of the execution schedule of the pre-air conditioning when the execution of the pre-air conditioning is notified to the user for a second predetermined number of times.

Accordingly, it is possible to automatically cancel the setting of the execution schedule of the pre-air conditioning when the unnecessary pre-air conditioning is repeated.

The electronic control unit may be configured to cancel the setting of the execution schedule of the pre-air conditioning when the air conditioner is actuated for a third predetermined number of times in accordance with the execution schedule of the pre-air conditioning.

Accordingly, it is possible to automatically cancel the setting of the execution schedule of the pre-air conditioning when the unnecessary pre-air conditioning is repeated.

According to the air conditioning control device of the vehicle in the present invention, it is possible to avoid energy consumption by repeated execution of the unnecessary pre-air conditioning in the vehicle with a pre-air conditioning function.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on embodiments of the present invention with reference to the drawings. It should be noted that same or corresponding portions in the drawings are denoted by the same reference numerals and that the description thereof will not be repeated in principle.

Figure 1:
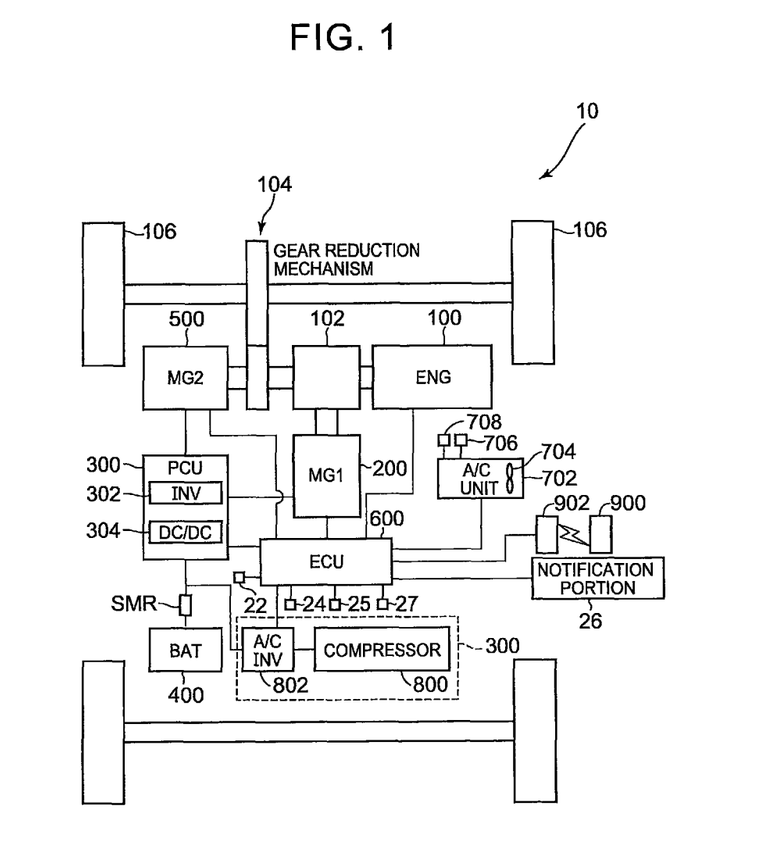
FIG. 1 is a block diagram for illustrating a schematic configuration of a vehicle that has a pre-air conditioning function according to first and second embodiments of the present invention.

Referring to FIG. 1, a description is now made on a vehicle in which an air conditioning control device according to a first embodiment of the present invention is mounted. The vehicle includes an engine 100, a first motor generator (MG) 200, a power control unit (PCU) 300, a battery 400, a second motor generator (MG) 500, an electronic control unit (ECU) 600, and an air conditioner (A/C) 702. The air conditioning control device according to this embodiment of the present invention is realized by a program that is executed by the ECU 600, for example.

This embodiment will be described by using a hybrid vehicle in which the engine 100 is mounted as the vehicle. However, instead of the hybrid vehicle, a fuel cell vehicle in which a fuel cell is mounted, an electric vehicle, or a conventional vehicle may be used.

The engine 100 combusts an air-fuel mixture to rotate a crankshaft (not shown), thereby generating drive power. The drive power, which is generated by the engine 100, is divided into two passages by a power dividing mechanism 102. One is a passage for driving wheels 106 via a gear reduction mechanism 104. The other is a passage for driving the first MG 200 to generate electric power.

The first MG 200 is driven by the power of the engine 100, which is divided by the power dividing mechanism 102, to generate the electric power. The electric power, which is generated by the first MG 200, is used for different purposes in accordance with an operation state of the vehicle or a state of charge (SOC) of the battery 400. For example, during a normal travel or during rapid acceleration, the electric power, which is generated by the first MG 200, is supplied to the second MG 500 via the PCU 300.

On the other hand, in a case where the SOC of the battery 400 is lower than a predetermined value, the electric power, which is generated by the first MG 200, is converted from AC power to DC power by an inverter 302 of the PCU 300. Then, after a voltage of the electric power is adjusted by a converter 304, the electric power is stored in the battery 400.

The battery 400 is a battery pack that is configured by connecting a plurality of battery modules in series, the battery module having a plurality of integrated battery cells. A capacitor (condenser) may be used instead of the battery 400.

The second MG 500 is a three-phase AC rotary electric machine. The second MG 500 is driven by at least either of the electric power stored in the battery 400 or the electric power generated by the first MG 200. The drive power of the second MG 500 is transmitted to the wheels 106 via the gear reduction mechanism 104. Accordingly, the second MG 500 assists the engine 100 in running the vehicle, or the drive power from the second MG 500 is solely used to run the vehicle.

During regenerative breaking of the vehicle, the second MG 500 is driven by the wheels 106 via the gear reduction mechanism 104, and the second MG 500 is actuated as a generator. Thus, the second MG 500 is actuated as a regenerative brake that converts braking energy to the electric power. The electric power generated by the second MG 500 is stored in the battery 400 via the inverter 302 and the converter 304.

Based on a traveling state of the vehicle, an accelerator pedal operation amount, the SOC and a temperature of the battery 400, a map and a program stored in a memory, or the like, the ECU 600 executes arithmetic processing. Accordingly, the ECU 600 controls various equipment mounted in the vehicle, so as to bring the vehicle into a desired operation state.

The ECU 600 controls the A/C 702 in accordance with a cabin temperature that is detected by a cabin temperature sensor 706 and an operation state of a switch 708 that is operated by an occupant. The air at a blowout temperature that is set by the ECU 600 is blown out of the A/C 702. Based on the cabin temperature, the ECU 600 determines a voltage at which an A/C fan 704 is driven in a stepwise manner.

In addition, the ECU 600 computes a rotational speed of a compressor 800 that is driven when the A/C 702 executes a cooling operation. The ECU 600 controls an A/C inverter 802 connected to the battery 400 such that the rotational speed of the compressor 800 corresponds to a computed rotational speed. The compressor 800 is driven when the electric power is supplied thereto from the battery 400 via the A/C inverter 802. When the compressor 800 is driven and a refrigerant is compressed, the A/C 702 executes the cooling operation. The A/C 702 may be configured to execute a warming operation by using the electric power that is supplied from the battery 400.

The A/C 702 is operable in a case where a remote controller 900 is operated on the outside of the vehicle, in addition to a case where the occupant in the cabin operates the switch 708. A receiver 902 is connected to the ECU 600 in order to receive a signal transmitted from the remote controller 900. Pre-air conditioning for the cooling operation or the warming operation is executed by the remote controller 900 and the receiver 902 before the occupant gets in the vehicle.

The vehicle 10 further includes a power switch 22, a door sensor 24, a seating sensor 25, a key sensor 27, and a notification portion 26.

The door sensor 24 detects opening/closing of an unillustrated door of the vehicle 10. The seating sensor 25 detects application of a load to an unillustrated occupant seat of the vehicle 10, and thereby detects seating on the seat. The key sensor 27 detects release of an unillustrated key of the vehicle.

The power switch 22 is an operation switch for a user to start and stop operating the vehicle. An electric power supply state of the vehicle makes transitions among states of "OFF", "ACC-ON", "IG-ON", and "READY-ON" by the power switch 22.

When the electric power supply state is "OFF", auxiliary machines such as the A/C 702 cannot be used, the ECU 600 is powered off (stopped), and a system main relay SMR is turned off (opened). Since the electric power cannot be supplied from the battery 400 in this "OFF" state, the vehicle 10 cannot be driven.

When the power switch 22 is pressed without operating a foot brake pedal in the "OFF" state, the electric power supply state makes the transition to "ACC-ON". "ACC-ON" is a state in which only an accessory electric power supply is turned on. In this state, basically, the ECU 600 is powered off (stopped), and the system main relay SMR is also turned off (opened). The auxiliary machines such as the A/C can be used by using the electric power of an auxiliary machine battery (not shown).

When the power switch 22 is pressed without operating the foot brake pedal in the "ACC-ON" state, the electric power supply state makes the transition to "IG-ON". "IG-ON" is a state in which the auxiliary machines such as the A/C 702 can be driven, and in which the ECU 600 is powered on (activated). Although the system main relay SMR is basically turned off (opened), it is connected when the auxiliary machine is used.

When the power switch 22 is pressed while the foot brake pedal is depressed in the "ACC-ON" state, the electric power supply state makes the transition to "READY-ON". "READY-ON" is a state in which preparation for traveling is completed, in which the ECU 600 is powered on (activated), and the system main relay SMR is turned on. In this "READY-ON" state, the electric power is supplied from the battery 400 to the PCU 300 to run the vehicle 10.

The notification portion 26 is configured to follow a command from the ECU 600 and output a visual and/or auditory message to the user. Accordingly, the notification portion 26 can inform the user of information. For example, the notification portion 26 can include a liquid crystal touch panel (instrument panel) and/or a speaker in the cabin.

The ECU 600 operates the A/C 702 even when a driver is not in the vehicle 10. Accordingly, the ECU 600 can execute air conditioning in the cabin. In other words, the vehicle 10 is configured capable of executing pre-air conditioning.

Figure 2:
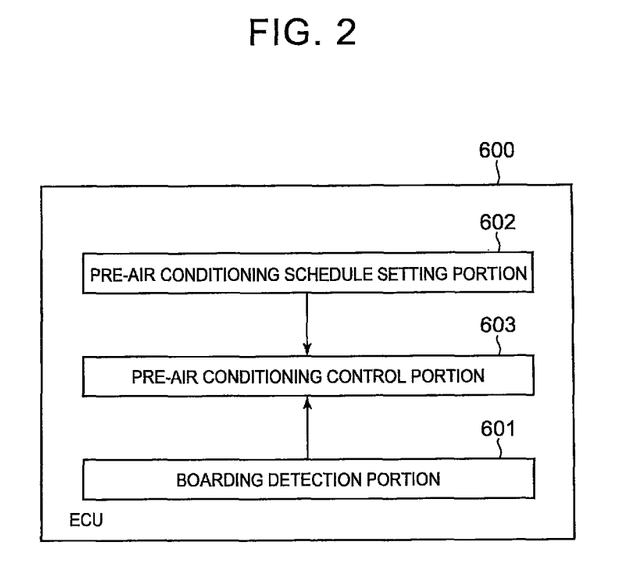
FIG. 2 is a view for showing components in an ECU shown in FIG. 1, the components being related to pre-air conditioning.

FIG. 2 is a view for showing components in the ECU 600 that are related to the pre-air conditioning. A boarding detector 601 uses the door sensor 24 to detect boarding of the user (a person) on the vehicle 10 by corresponding to opening of the door. The boarding detector 601 detects the boarding of the user (person) on the vehicle 10 on the basis of the output of the seating sensor 25. The boarding detector 601 uses the key sensor 27 to detect the boarding of the user (person) on the vehicle 10 by corresponding to the release of the key. The boarding detector 601 detects the boarding of the user (person) on the vehicle 10 when the electric power supply state of the vehicle becomes the "IG-ON" state or the "READY-ON" state by the power switch 22.

The pre-air conditioning schedule setting portion 602 sets an execution schedule of the pre-air conditioning for actuating the A/C 702 before the boarding of the user by an operation of the remote controller 900 by the user or the like.

Figure 3:
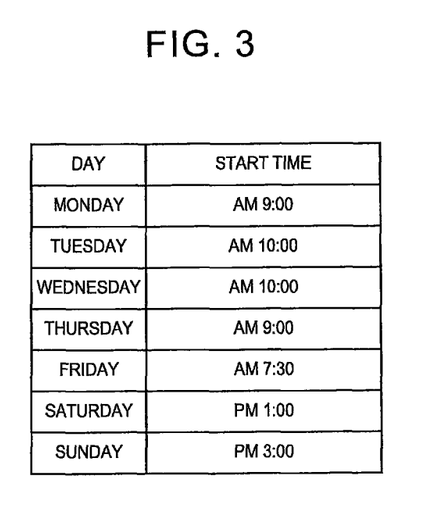
FIG. 3 is a table for showing an example of an execution schedule of the pre-air conditioning in this embodiment.

FIG. 3 is a table for showing an example of the execution schedule of the pre-air conditioning. As shown in FIG. 3, a driver sets what time the pre-air conditioning is executed on Monday through Sunday through the remote controller 900 or the like. The user may also be able to set a duration of the pre-air conditioning, a preset temperature of the pre-air conditioning, and the like, in addition to a start time of the pre-air conditioning.

A pre-air conditioning control portion 603 has a clock (timer) function, turns on the system main relay SMR at the start time of the pre-air conditioning in accordance with the execution schedule of the pre-air conditioning, actuates the A/C 702, the inverter 802, and the compressor 800, and thereby starts the pre-air conditioning. During the execution of the pre-air conditioning, the pre-air conditioning control portion 603 causes the inverter 302 and the converter 304 to remain stopped.

Once the cabin temperature reaches a predetermined temperature (a user preset temperature, for example) or a predetermined air conditioning duration elapses after starting of the pre-air conditioning, the pre-air conditioning control portion 603 causes the A/C 702, the inverter 802, and the compressor 800 to stop, thereby terminating the pre-air conditioning.

In a case where such an execution schedule of the pre-air conditioning is set, when an erroneous setting is done, or when a time to use the vehicle by the driver is changed so that the vehicle is used at a time that is completely different from the time set in the execution schedule, the pre-air conditioning is executed, and thus the stored electric power in the battery 400 is used wastefully.

Accordingly, in order to avoid repetitive execution of such unnecessary pre-air conditioning, the pre-air conditioning control portion 603 according to this embodiment notifies the user about an execution history of the pre-air conditioning and cancels the setting of the execution schedule of the pre-air conditioning when a certain condition is satisfied.

Figure 4:
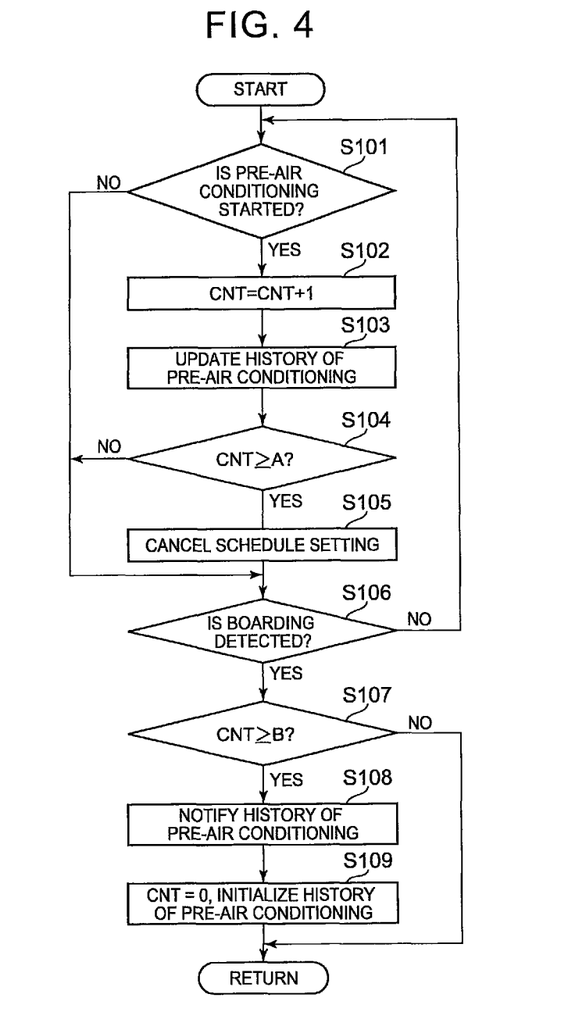
FIG. 4 is a flowchart for showing control procedures of the pre-air conditioning in the first embodiment of the present invention.

FIG. 4 is a flowchart for showing control procedures of the pre-air conditioning in the first embodiment. The control process that follows the flowchart shown in FIG. 4 is executed by the ECU 600 in FIG. 1.

In a step S101, at a start date and time set in the execution schedule of the pre-air conditioning, the pre-air conditioning control portion 603 turns on the system main relay SMR, and instructs the A/C 702, the inverter 802, and the compressor 800 to execute the pre-air conditioning. Then, the process proceeds to a step S102. Except for the set start date and time, the process proceeds to a step S106.

In the step S102, the pre-air conditioning control portion 603 increments a count value CNT.

In a step S103, the pre-air conditioning control portion 603 updates a history of the pre-air conditioning. In other words, the pre-air conditioning control portion 603 adds a date and time at which the pre-air conditioning is executed to the history of the pre-air conditioning.

In a step S104, if the count value CNT is a predetermined value A or higher, the process proceeds to a step S105. If the count value CNT is lower than the predetermined value A, the process proceeds to the step S106.

In the step S105, the pre-air conditioning control portion 603 cancels the setting of the execution schedule of the pre-air conditioning.

In the step S106, if the boarding detector 601 detects the boarding on the vehicle, the process proceeds to a step S107. If the boarding on the vehicle is not detected, the process returns to the step S101.

In the step S107, if the count value CNT is a predetermined value B or higher, the process proceeds to a step S108. If the count value CNT is lower than the predetermined value B, the process is terminated.

Figure 5:
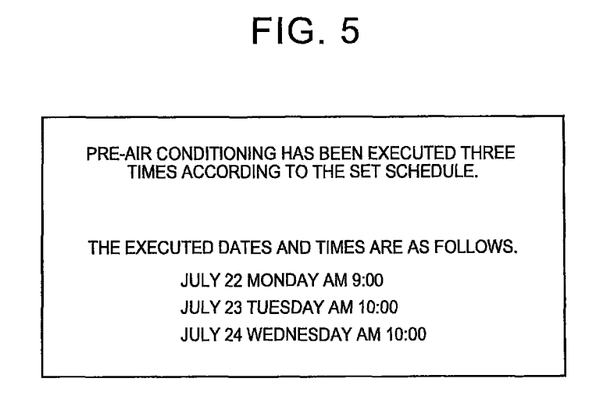
FIG. 5 is a view for showing a notification example of a history of the pre-air conditioning in the first embodiment.

In the step S108, the pre-air conditioning control portion 603 notifies about the history of the pre-air conditioning like one shown in FIG. 5 through the notification portion 26. In an example of FIG. 5, the notified history of the pre-air conditioning includes a fact that the pre-air conditioning was executed, the number of times the pre-air conditioning was executed, and the dates and times at which the pre-air conditioning was executed.

In a step S109, the ECU 600 initializes the count value CNT to 0 so as to initialize the history of the pre-air conditioning.

Next, a description will be made on how control is executed for a specified value of each of the predetermined values A and B.

(Example 1: A=3, B=1) The following operation is executed when the predetermined value A is set to "3", and the predetermined value B is set to "1".

If the pre-air conditioning is executed once or more since the last boarding on the vehicle, the history of the pre-air conditioning (once or more) that is executed since the last boarding is notified to the driver when she/he gets in the vehicle, regardless of whether the setting of the execution schedule of the pre-air conditioning is maintained or canceled. Accordingly, the driver can know the execution of the unnecessary pre-air conditioning.

However, even in a case where the driver gets in the vehicle on schedule after the pre-air conditioning is executed once, the history of the pre-air conditioning is notified. This pre-air conditioning is not wasteful but has a purpose of informing the driver that the pre-air conditioning has reliably been executed.

After the pre-air conditioning is executed for three times since the last boarding on the vehicle, the setting of the execution schedule of the pre-air conditioning is canceled. When the driver gets in the vehicle thereafter, the history of the pre-air conditioning (three times or more) that is executed since the last boarding is notified.

(Example 2: A=5, B=2) The following operation is executed when the predetermined value A is set to "5", and the predetermined value B is set to "2".

If the pre-air conditioning is executed twice or more since the last boarding on the vehicle, the history of the pre-air conditioning (twice or more) that is executed since the last boarding is notified to the driver when she/he gets in the vehicle, regardless of whether the execution schedule of the pre-air conditioning is maintained or canceled. Accordingly, the driver can know the execution of the unnecessary pre-air conditioning.

Figure 6:
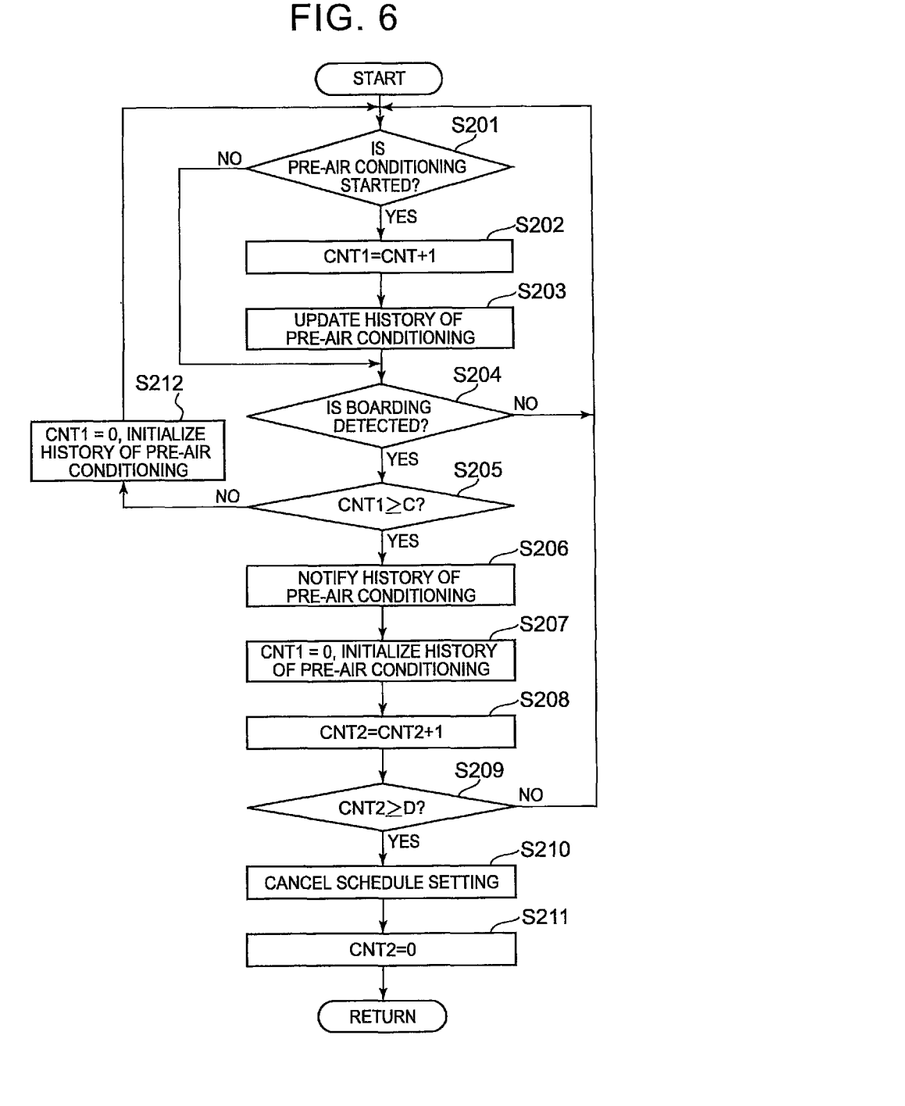
FIG. 6 is a flowchart for showing control procedures of the pre-air conditioning in the second embodiment of the present invention.

After the pre-air conditioning is executed for five times since the last boarding on the vehicle, the setting of the execution schedule of the pre-air conditioning is canceled. When the driver gets in the vehicle thereafter, the history of the pre-air conditioning (five times or more) that is executed since the last boarding is notified Next, a second embodiment of the present invention will be described. FIG. 6 is a flowchart for showing control procedures of the pre-air conditioning in the second embodiment. The control process that follows the flowchart shown in FIG. 6 is executed by the ECU 600 in FIG. 1.

In a step S201, at a start date and time set in the execution schedule of the pre-air conditioning, the pre-air conditioning control portion 603 turns on the system main relay SMR, and instructs the A/C 702, the inverter 802, and the compressor 800 to execute the pre-air conditioning. Then, the process proceeds to a step S202. Except for the set start date and time, the process proceeds to a step S204.

In the step S202, the pre-air conditioning control portion 603 increments a count value CNT1.

In a step S203, the pre-air conditioning control portion 603 updates the history of the pre-air conditioning. In other words, the pre-air conditioning control portion 603 adds the date and time at which the pre-air conditioning is executed to the history of the pre-air conditioning.

In the step S204, if the boarding detector 601 detects the boarding on the vehicle, the process proceeds to a step S205. If the boarding on the vehicle is not detected, the process returns to the step S201.

In the step S205, if the count value CNT1 is a predetermined value C or higher, the process proceeds to a step S206. If the count value CNT1 is lower than the predetermined value C, the process proceeds to a step S212.

In the step S206, the pre-air conditioning control portion 603 notifies about the history of the pre-air conditioning through the notification portion 26.

In a step S207, the pre-air conditioning control portion 603 initializes the count value CNT1 to 0 so as to initialize the history of the pre-air conditioning.

In a step S208, the pre-air conditioning control portion 603 increments a count value CNT2.

In a step S209, if the count value CNT2 is a predetermined value D or higher, the process proceeds to a step S210. If the count value CNT2 is lower than the predetermined value D, the process returns to the step S201.

In the step S210, the pre-air conditioning control portion 603 cancels the setting of the execution schedule of the pre-air conditioning.

In a step S211, the pre-air conditioning control portion 603 initializes the count value CNT2 to 0.

As in the step S207, also in the step S212, the pre-air conditioning control portion 603 initializes the count value CNT1 to 0 so as to initialize the history of the pre-air conditioning. Then, the process returns to the step S201.

Next, a description will be made on how control is executed for a specified value of each of the predetermined values C and D.

(Example 1: C=3, D=3) The following operation is executed when the predetermined value C is set to "3", and the predetermined value D is set to "3".

If the pre-air conditioning is executed once or more since the last boarding on the vehicle, the history of the pre-air conditioning (once or more) that is executed since the last boarding is notified to the driver when she/he gets in the vehicle, and the setting of the execution schedule of the pre-air conditioning is maintained. Accordingly, the driver can know the execution of the unnecessary pre-air conditioning. However, as in the first embodiment, even in the case where the driver gets in the vehicle on schedule after the pre-air conditioning is executed once, the history of the pre-air conditioning is notified.

After such notification of the history of the pre-air conditioning is executed for three times, the setting of the execution schedule of the pre-air conditioning is canceled. Thus, it is possible to prevent the execution of the unnecessary pre-air conditioning.

(Example 1: C=3, D=2) The following operation is executed when the predetermined value C is set to "3", and the predetermined value D is set to "2".

If the pre-air conditioning is executed three times or more since the last boarding on the vehicle, the history of the pre-air conditioning (three times or more) that is executed since the last boarding is notified to the driver when she/he gets in the vehicle, and the setting of the execution schedule of the pre-air conditioning is maintained. Accordingly, the driver can know the execution of the unnecessary pre-air conditioning.

After the notification of the history of the pre-air conditioning is executed twice, the setting of the execution schedule of the pre-air conditioning is canceled. Accordingly, it is possible to prevent the execution of the unnecessary pre-air conditioning.

The embodiments of the disclosure should be considered in all respects as illustrative and not restrictive. It is intended that the scope of the present invention is defined not by the above description but by the claims appended hereto and includes all changes that fall within and meaning equivalent to the claims.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An air conditioning control device for a vehicle in which an air conditioner that adjusts a temperature in a cabin is mounted, the air conditioning control device comprising:
   a setting portion configured to set an execution schedule of pre-air conditioning to actuate the air conditioner before a user gets in the vehicle;
   a detector configured to detect boarding of the user on the vehicle; and
   an electronic control unit configured to:
   actuate the air conditioner in accordance with the set execution schedule of the pre-air conditioning, and
   visually notify the user about execution of the pre-air conditioning when the boarding is detected after the air conditioner is actuated in accordance with the set execution schedule of the pre-air conditioning; and
   when the boarding is detected, notify the user about an execution history of the execution of the pre-air conditioning occurring when the boarding is not detected, after a first predetermined number of times that the execution of the pre-air conditioning occurs when the boarding is not detected.

2. The air conditioning control device according to claim 1, wherein
   the electronic control unit is configured to notify about the execution of the pre-air conditioning as well as a date and time when the pre-air conditioning is executed and/or the number of times that the pre-air conditioning is executed.

3. The air conditioning control device according to claim 1, wherein
   the electronic control unit is configured to cancel setting of the execution schedule of the pre-air conditioning when the execution of the pre-air conditioning is notified to the user for a second predetermined number of times.

4. The air conditioning control device according to claim 1, wherein
   the electronic control unit is configured to cancel setting of the execution schedule of the pre-air conditioning when the air conditioner is actuated in accordance with the set execution schedule of the pre-air conditioning for a third predetermined number of times.

5. The air conditioning control device according to claim 1, wherein the execution schedule is a schedule that identifies specific dates and times when the pre-air conditioning is executed.

6. The air conditioning control device according to claim 1, wherein the first predetermined number of times that the execution of the pre-air conditioning occurs when the boarding is not detected is at least two times.

* * * * *